(12) United States Patent
Hakeem et al.

(10) Patent No.: US 9,366,197 B2
(45) Date of Patent: Jun. 14, 2016

(54) METHODS AND SYSTEMS FOR DETERMINING A FUEL CONCENTRATION IN ENGINE OIL USING AN INTAKE OXYGEN SENSOR

(71) Applicant: Ford Global Technologies, LLC, Dearborn, MI (US)

(72) Inventors: Mohannad Hakeem, Dearborn, MI (US); Gopichandra Surnilla, West Bloomfield, MI (US); James Eric Anderson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/969,590

(22) Filed: Dec. 15, 2015

(65) Prior Publication Data
US 2016/0102619 A1 Apr. 14, 2016

Related U.S. Application Data

(63) Continuation of application No. 14/252,679, filed on Apr. 14, 2014, now Pat. No. 9,234,476.

(51) Int. Cl.
*F01M 13/00* (2006.01)
*F02D 41/00* (2006.01)
*F02D 41/14* (2006.01)

(52) U.S. Cl.
CPC ........ *F02D 41/0052* (2013.01); *F02D 41/0055* (2013.01); *F02D 41/144* (2013.01); *F02D 41/1454* (2013.01); *F02D 41/1459* (2013.01); *F02D 41/1486* (2013.01); *F02M 26/46* (2016.02); *F02D 2250/08* (2013.01); *F02D 2250/11* (2013.01); *F02M 2026/004* (2016.02)

(58) Field of Classification Search
CPC .............. F02D 41/144; F02D 41/1459; F02D 2250/08; F02D 2250/11; F02M 25/0755; F02M 2025/0762; F02M 26/46; F02M 2026/004
USPC ............. 701/108, 109; 123/568.16, 572, 573, 123/704
See application file for complete search history.

(56) References Cited

U.S. PATENT DOCUMENTS

| | | | |
|---|---|---|---|
| 4,236,492 | A | 12/1980 | Tholen |
| 4,601,273 | A | 7/1986 | Kitahara et al. |
| 5,348,630 | A | 9/1994 | Yagi et al. |
| 5,392,598 | A | 2/1995 | White et al. |
| 6,182,498 | B1 | 2/2001 | Mizutani et al. |
| 6,363,922 | B1 | 4/2002 | Romzek et al. |
| 6,739,177 | B2 | 5/2004 | Sato et al. |

(Continued)

FOREIGN PATENT DOCUMENTS

| | | | |
|---|---|---|---|
| DE | 102010042104 A1 | 4/2012 | |
| EP | 0005613 A2 | 11/1979 | |

(Continued)

*Primary Examiner* — Erick Solis
(74) *Attorney, Agent, or Firm* — Julia Voutyras; Alleman Hall McCoy Russell & Tuttle LLP

(57) ABSTRACT

Methods and systems are provided for estimating a fuel concentration in engine oil in an engine crankcase. In one example, an engine controller may adjust engine operation such as EGR flow and engine fueling based on the estimated fuel concentration in engine oil. The fuel concentration may be based on an output of an intake oxygen sensor when purge and EGR flow are disabled, engine oil temperature, and fuel composition.

13 Claims, 7 Drawing Sheets

(56) References Cited

U.S. PATENT DOCUMENTS

| | | |
|---|---|---|
| 6,742,379 B2 | 6/2004 | Matsubara et al. |
| 6,826,903 B2 | 12/2004 | Yahata et al. |
| 7,311,094 B2 * | 12/2007 | Mallebrein ............ F02D 19/12 |
| | | 123/572 |
| 7,712,457 B2 | 5/2010 | Porten et al. |
| 7,950,377 B2 | 5/2011 | Busato et al. |
| 8,020,538 B2 | 9/2011 | Surnilla et al. |
| 8,141,545 B2 | 3/2012 | Matsuura et al. |
| 8,296,042 B2 | 10/2012 | Xiao et al. |
| 8,392,098 B2 | 3/2013 | Yamashita |
| 8,495,996 B2 | 7/2013 | Soltis et al. |
| 8,522,760 B2 | 9/2013 | Soltis |
| 8,554,446 B2 | 10/2013 | Sano et al. |
| 8,763,394 B2 | 7/2014 | Freund |
| 8,857,155 B2 | 10/2014 | Surnilla et al. |
| 9,051,890 B2 | 6/2015 | Surnilla et al. |
| 9,103,275 B2 | 8/2015 | Quix et al. |
| 9,109,523 B2 | 8/2015 | Surnilla et al. |
| 9,163,575 B2 | 10/2015 | Pursifull |
| 9,181,887 B2 | 11/2015 | Surnilla et al. |
| 9,234,476 B2 * | 1/2016 | Hakeem ................ F02D 41/144 |
| 2011/0282539 A1 | 11/2011 | Inoue |
| 2013/0061831 A1 | 3/2013 | Gambhir et al. |
| 2013/0139795 A1 | 6/2013 | Saitoh et al. |
| 2014/0100762 A1 | 4/2014 | VanDerWege et al. |
| 2014/0109568 A1 | 4/2014 | Glugla et al. |
| 2014/0109846 A1 | 4/2014 | Styles et al. |
| 2014/0109880 A1 | 4/2014 | Styles et al. |
| 2014/0110488 A1 | 4/2014 | Surnilla et al. |
| 2014/0251285 A1 | 9/2014 | Surnilla et al. |
| 2015/0047339 A1 | 2/2015 | Rollinger et al. |
| 2015/0047603 A1 | 2/2015 | Surnilla et al. |
| 2015/0051811 A1 | 2/2015 | Song et al. |
| 2015/0075502 A1 | 3/2015 | Surnilla et al. |
| 2015/0075503 A1 | 3/2015 | Surnilla et al. |
| 2015/0101327 A1 | 4/2015 | Clark et al. |
| 2015/0101328 A1 | 4/2015 | Surnilla et al. |
| 2015/0101564 A1 | 4/2015 | Surnilla et al. |
| 2015/0121864 A1 | 5/2015 | Surnilla et al. |
| 2015/0128916 A1 | 5/2015 | Surnilla et al. |
| 2015/0240730 A1 | 8/2015 | Styles et al. |
| 2015/0292429 A1 | 10/2015 | Surnilla et al. |

FOREIGN PATENT DOCUMENTS

| | | |
|---|---|---|
| EP | 0844380 B1 | 2/1998 |
| EP | 1724453 A1 | 11/2006 |
| EP | 1808591 A2 | 7/2007 |
| EP | 2292913 A1 | 3/2011 |
| GB | 2487240 A | 7/2012 |
| JP | S60224938 A | 11/1985 |
| JP | 5038992 B2 | 10/2012 |
| WO | 2009009902 A1 | 1/2009 |
| WO | 2011073512 A1 | 6/2011 |
| WO | 2013030562 A1 | 3/2013 |

* cited by examiner

METHODS AND SYSTEMS FOR DETERMINING A FUEL CONCENTRATION IN ENGINE OIL USING AN INTAKE OXYGEN SENSOR

CROSS REFERENCE TO RELATED APPLICATION

The present application is a continuation of U.S. patent application Ser. No. 14/252,679, entitled "METHODS AND SYSTEMS FOR DETERMINING A FUEL CONCENTRATION IN ENGINE OIL USING AN INTAKE OXYGEN SENSOR," filed on Apr. 14, 2014, the entire contents of which are hereby incorporated by reference for all purposes.

FIELD

The present description relates generally to a gas constituent sensor included in an intake system of an internal combustion engine.

BACKGROUND/SUMMARY

Engine systems may utilize recirculation of exhaust gas from an engine exhaust system to an engine intake system (intake passage), a process referred to as exhaust gas recirculation (EGR), to reduce regulated emissions and improve fuel economy. An EGR system may include various sensors to measure and/or control the EGR. As one example, the EGR system may include an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent. One example of such an intake oxygen sensor is shown by Matsubara et al. in U.S. Pat. No. 6,742,379. The EGR system may additionally or optionally include an exhaust gas oxygen sensor coupled to the exhaust manifold for estimating a combustion air-fuel ratio.

As such, due to the location of the oxygen sensor downstream of a charge air cooler in the high pressure air induction system, the sensor may be sensitive to the presence of fuel vapor and other reductants and oxidants such as oil mist. For example, during boosted engine operation, purge air and/or blow-by gases may be received at a compressor inlet location. Hydrocarbons ingested from purge air, the positive crankcase ventilation (PCV), and/or rich EGR can consume oxygen on the sensor catalytic surface and reduce the oxygen concentration detected by the sensor. In some cases, the reductants may also react with the sensing element of the oxygen sensor. The reduction in oxygen at the sensor may be incorrectly interpreted as a diluent when using the change in oxygen to estimate EGR. Thus, the sensor measurements may be confounded by the various sensitivities, the accuracy of the sensor may be reduced, and measurement and/or control of EGR may be degraded.

Hydrocarbons in the PCV flow may result from increased fuel in engine oil in a crankcase of the engine. For example, fuel may accumulate in the engine oil during engine cold start and warm-up conditions. The accumulated fuel may then be released as hydrocarbons while the engine is warming up and when the engine oil reaches a steady-state operating temperature. Hydrocarbons may affect various engine parameters and controls including fuel control and monitoring, engine oil viscosity, and the intake oxygen sensor output. Excessive fuel in the oil may decrease engine durability.

In one example, the issues described above may be addressed by a method for an engine comprising: adjusting engine operation based on a fuel concentration in engine oil, the fuel concentration based on an output of an intake oxygen sensor when purge and EGR flow are disabled, engine oil temperature, and fuel composition. A fuel evaporation from the engine oil may also be determined based on the estimated fuel concentration in engine oil. The fuel concentration in engine oil and the fuel evaporation rate may provide information as to the concentration of hydrocarbons in both the engine oil and the intake air when the engine is boosted. As a result, an engine controller may adjust engine operation based on the fuel concentration in engine oil and/or the fuel evaporation rate. In one example, the controller may correct an output of the intake oxygen sensor for EGR flow estimation based on the fuel concentration in the engine oil. Subsequently, the controller may adjust an EGR valve based on the estimated EGR flow. In another example, the controller may adjust fuel injection to the engine based on the fuel evaporation rate. For example, as the fuel evaporation rate increases, the controller may decrease an amount of fuel injection. In yet another example, the controller may use the fuel evaporation rate to predict subsequent intake oxygen readings from the intake oxygen sensor. If the predicted intake oxygen reading differs from an actual output of the intake oxygen sensor, the fuel evaporation rate estimation may be degraded and accurate compensation of the output of the intake oxygen sensor for EGR control may not be possible. As a result, the controller may indicate degradation of the estimation method and trigger a method to disable EGR flow until the hydrocarbon effect is reduced. In this way, adjusting engine operation based on the fuel concentration in engine oil and/or the fuel evaporation rate may increase the accuracy of engine control by providing a way to predict an amount of hydrocarbons in the intake airflow and subsequently adjust engine fueling and/or EGR flow based on the hydrocarbons in the airflow and engine oil. As a result, engine longevity may be increased and EGR flow may be delivered at a requested level.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
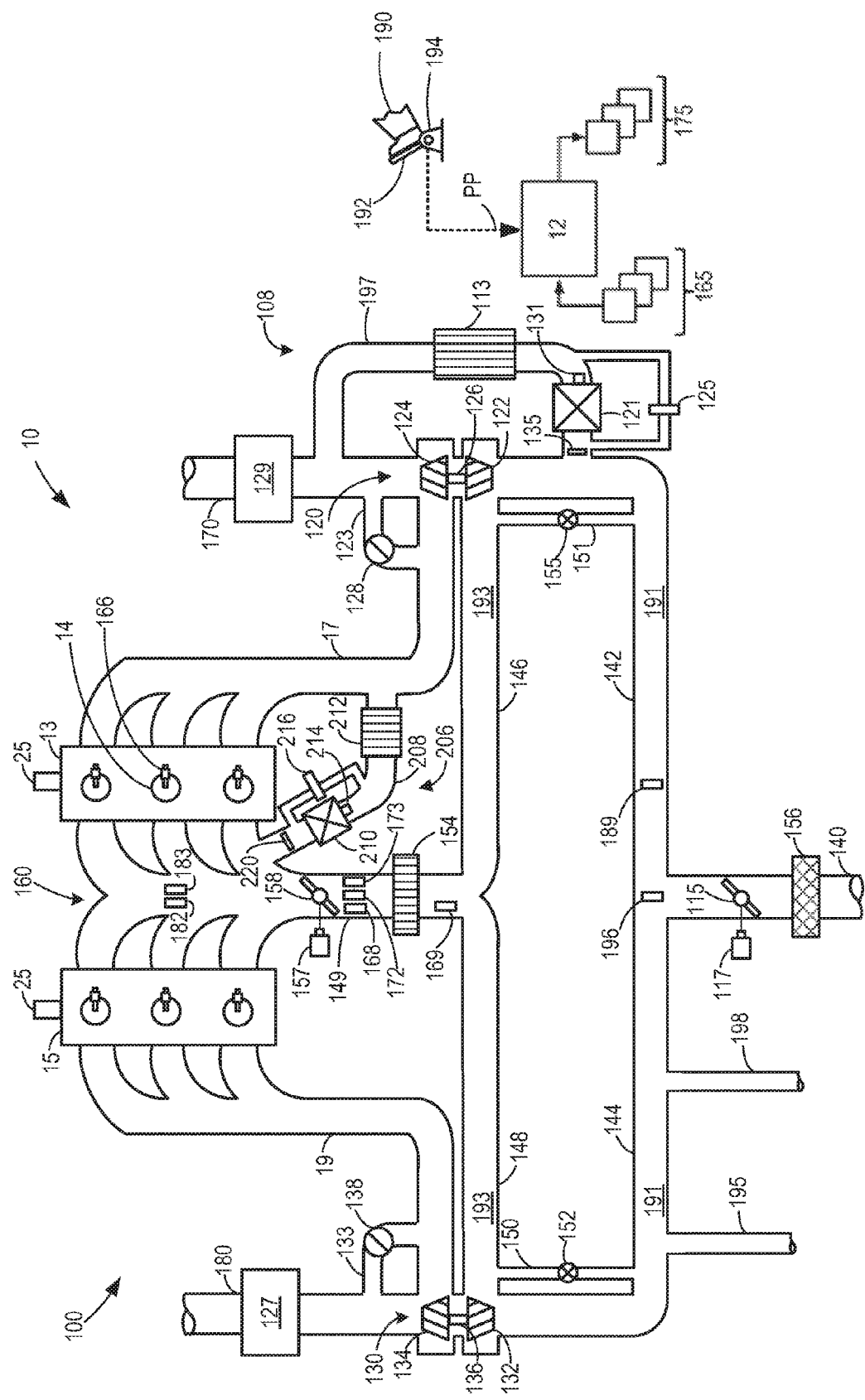
FIGS. 1-2 are schematic diagrams of an engine system.
Figure 2:
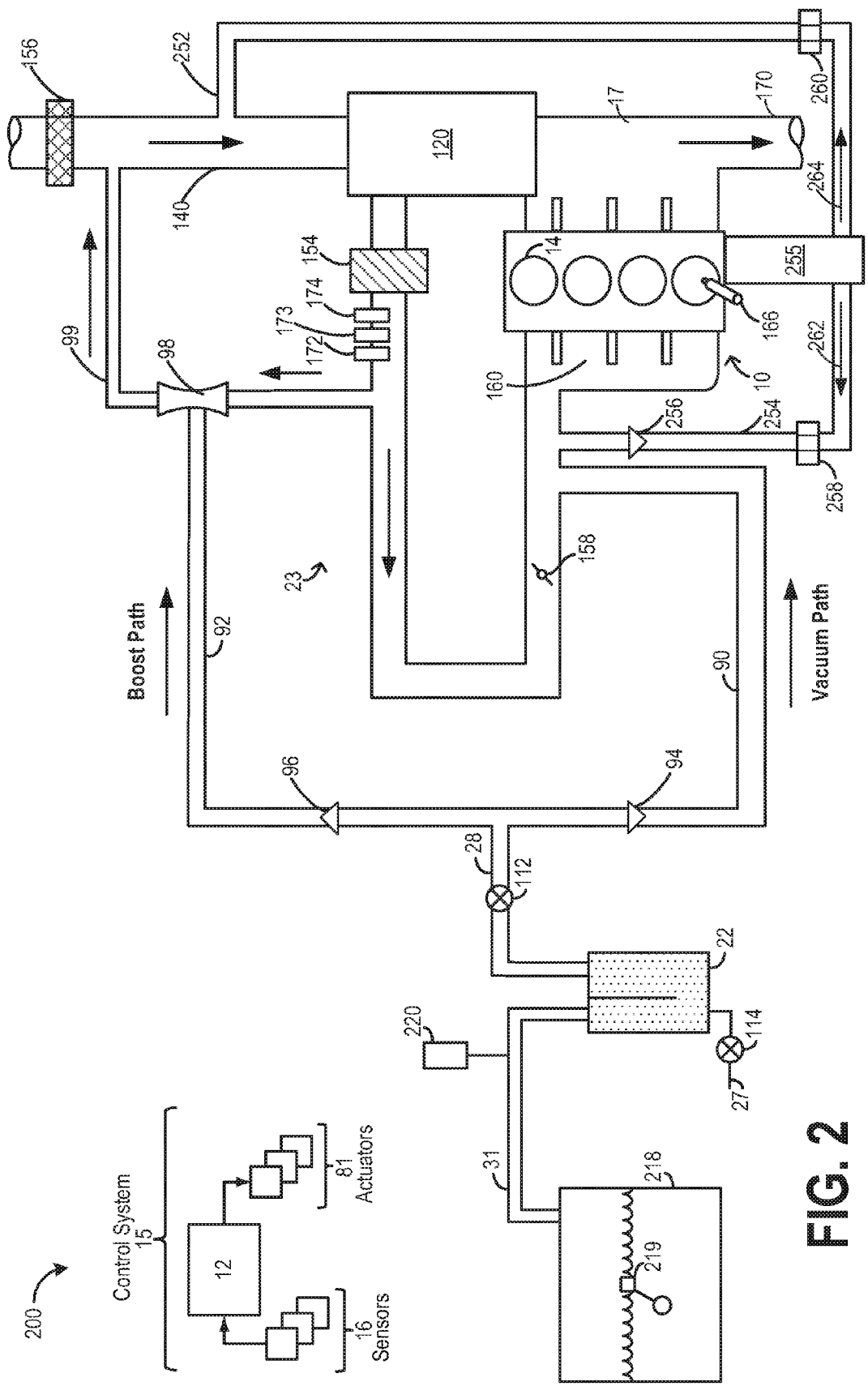
Figure 3:
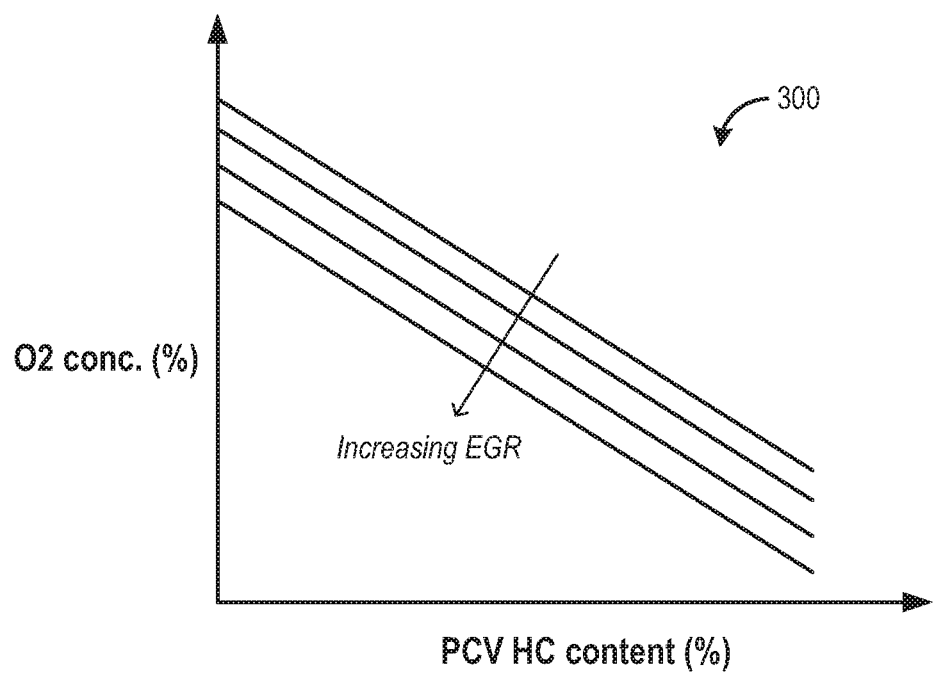
FIG. 3 is a map depicting the impact of PCV hydrocarbons the oxygen concentration estimated by an intake oxygen sensor.
Figure 4A:
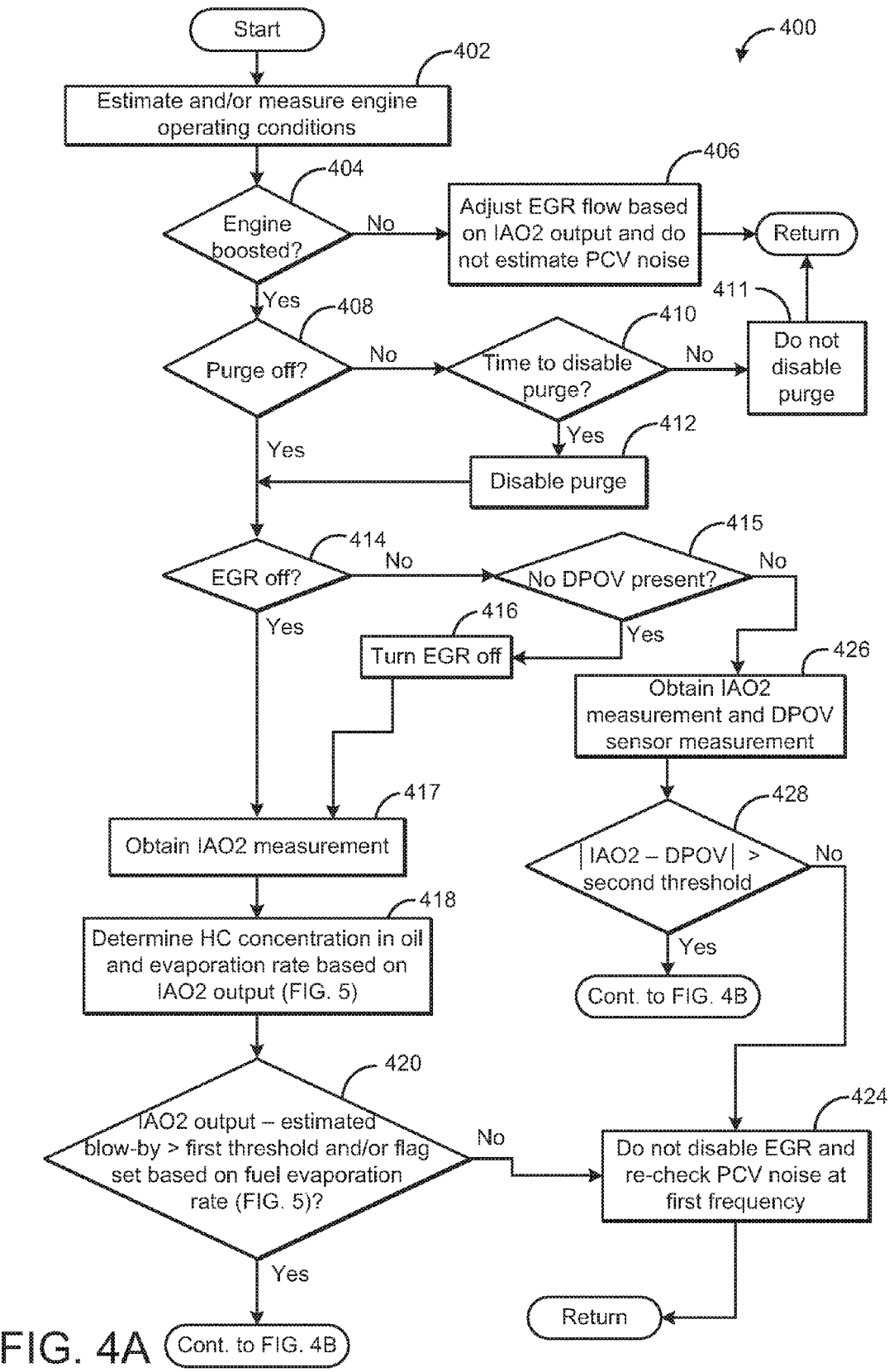
FIGS. 4A-4B show a method for disabling EGR flow when a hydrocarbon impact on an intake oxygen sensor is greater than a threshold.
Figure 4B:
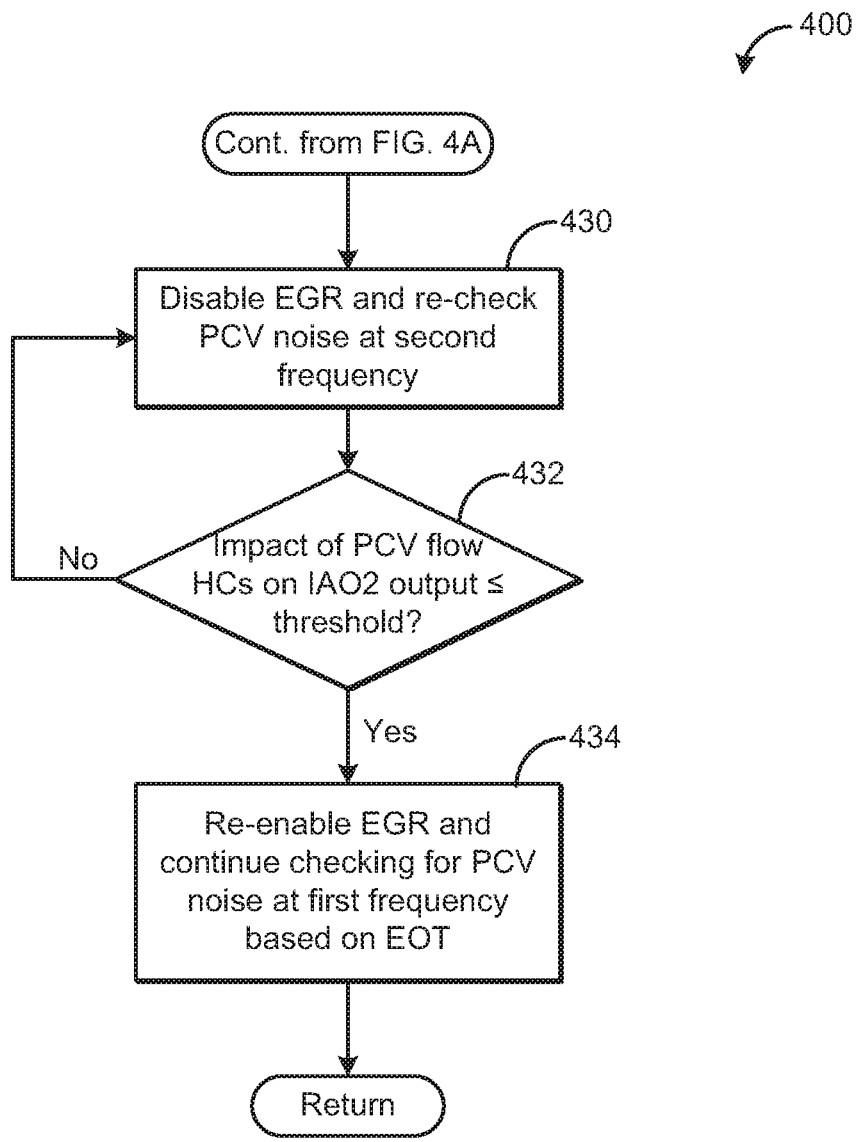
Figure 5:
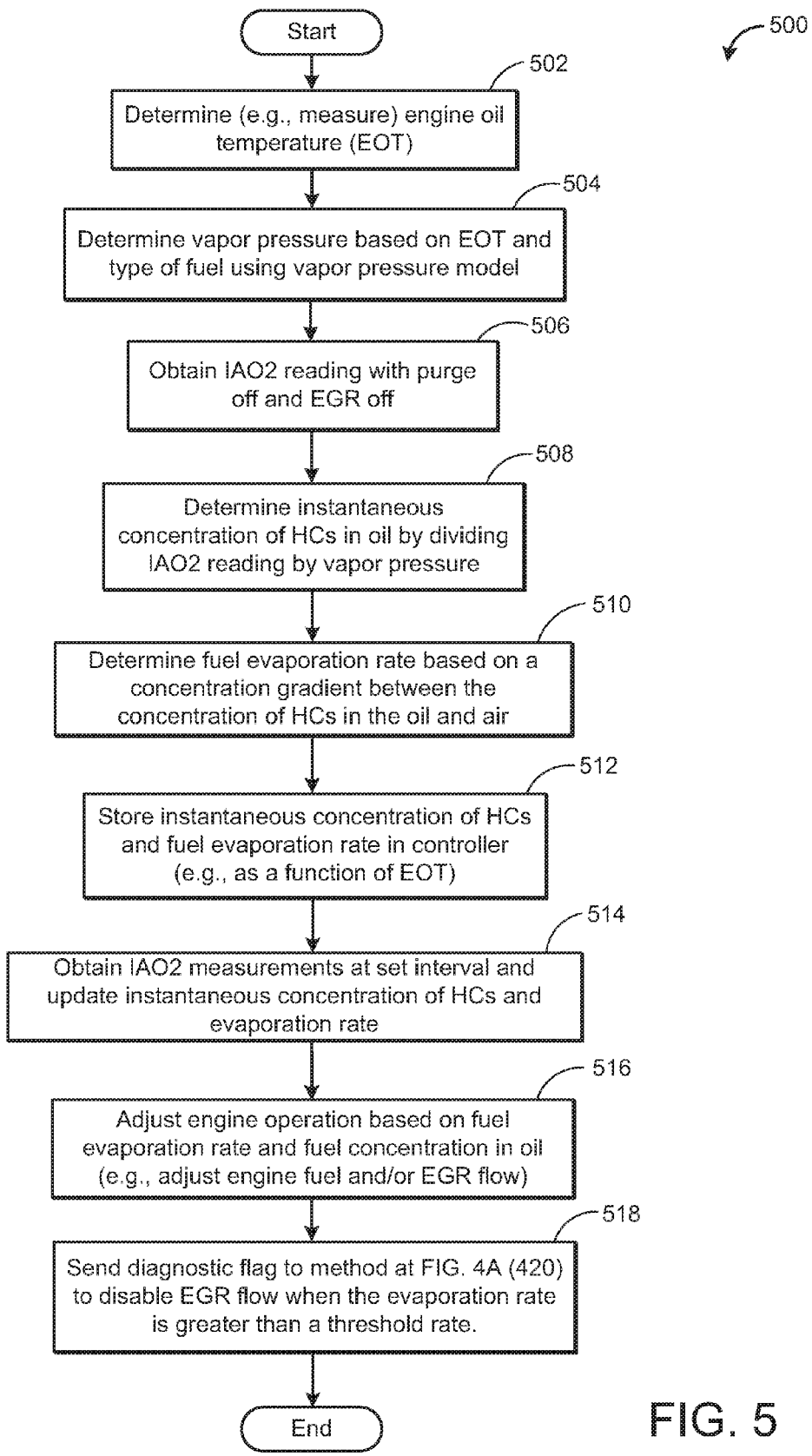
FIG. 5 shows a method for estimating a fuel concentration in engine oil and a fuel evaporation rate from the engine oil.
Figure 6:
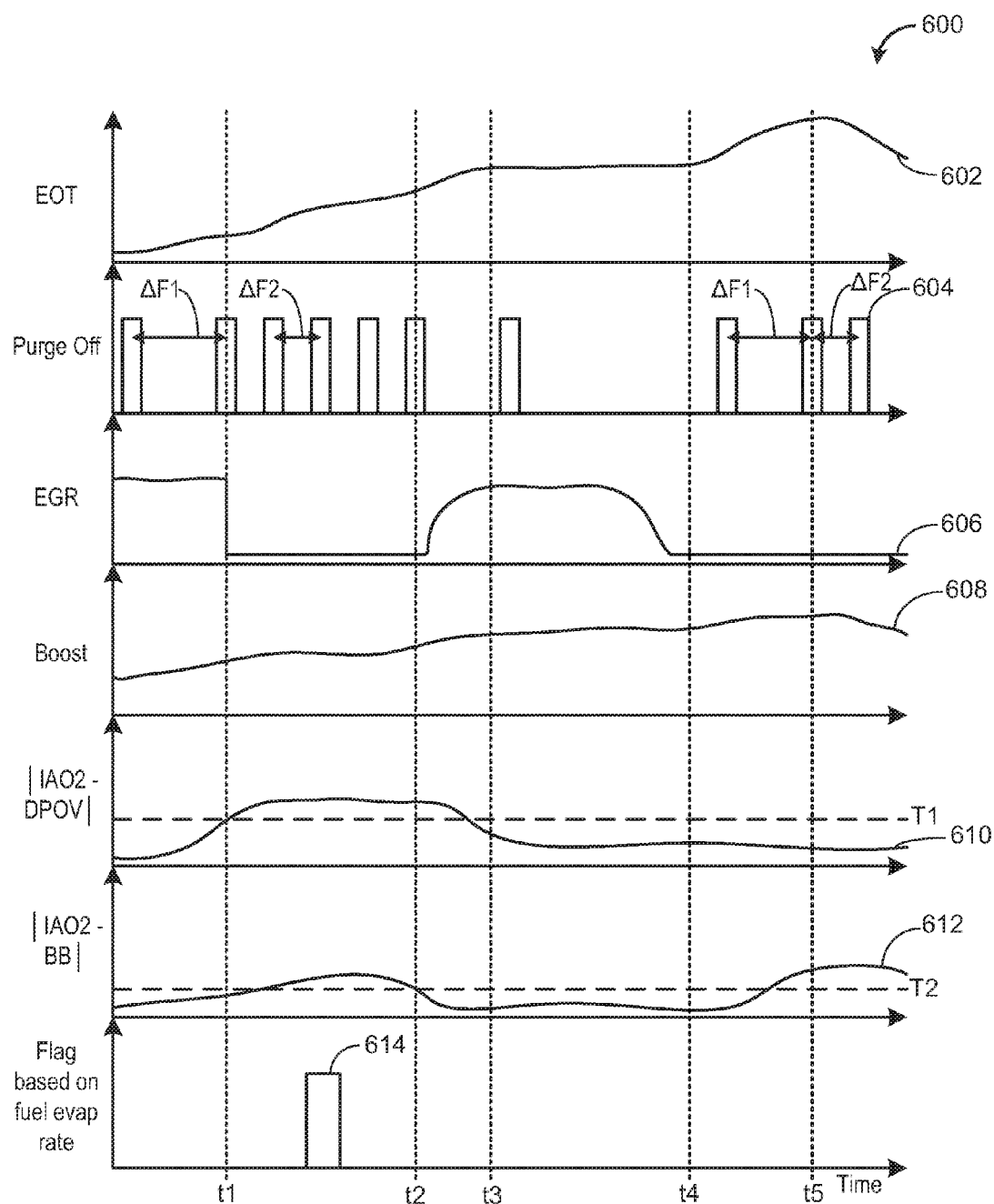
FIG. 6 shows a graph of example adjustments to EGR flow based on estimates of an impact of PCV hydrocarbons on an output of an intake oxygen sensor.

The following description relates to systems and methods for estimating an impact of PCV hydrocarbons on an output of an intake oxygen sensor and estimating a fuel concentration in engine oil. FIGS. 1-2 show example engines including a low-pressure exhaust gas recirculation (EGR) passage, a PCV system, and an intake oxygen sensor positioned in an intake passage downstream from the inlet of the LP-EGR passage and the inlet of the PCV system (during boosted operation) to the intake passage. During boosted engine operation, hydrocarbons (HCs) from the engine crankcase may enter the intake passage via PCV flow upstream of the intake oxygen sensor. As a result, a decrease in intake oxygen measured by the intake oxygen sensor may result from the PCV flow HCs and any additional diluents in the intake airflow (e.g., EGR or purge flow). This effect is shown at FIG. 3. However, the intake oxygen sensor may assume the decrease in intake oxygen is due to EGR alone and use this measurement to estimate EGR flow and adjust LP-EGR flow of the engine. As a result, EGR flow may not be adjusted to the desired level (e.g., may be reduced more than necessary). FIGS. 4A-4B show a method for estimating the impact of PCV HCs on the intake oxygen sensor output (e.g., PCV noise at the intake oxygen sensor) when purge is disabled. If the impact of PCV HCs on the intake oxygen sensor is greater than threshold, an engine controller may disable LP-EGR for a duration until the PCV noise is reduced back below the threshold. A source of HCs in the PCV flow may result from fuel in the engine oil in the crankcase. As engine oil temperature increases, a greater amount of HCs may be released into the air and enter the intake passage via the PCV flow. Example adjustments to EGR based on PCV noise are shown at FIG. 6. Additionally, a method for estimating the fuel concentration in the engine oil and a fuel evaporation rate from the engine oil is shown at FIG. 5. The controller may adjust engine operation responsive to the fuel concentration and fuel evaporation rate. For example, the intake oxygen sensor output may be adjusted and corrected for PCV flow based on the estimated fuel concentration in the engine oil. Additionally, flags indicating a need to disable purge via the method presented at FIG. 4 may be generated responsive to the fuel evaporation rate relative to intake oxygen sensor outputs. In this way, EGR adjustments due to inaccurate EGR flow estimates from an intake oxygen sensor impacted by PCV flow HCs may be reduced.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 4A-6.

Engine system 100 may receive intake air via intake passage 140. As shown at FIG. 1, intake passage 140 may include an air filter 156 and an air induction system (AIS) throttle 115. The position of AIS throttle 115 may be adjusted by the control system via a throttle actuator 117 communicatively coupled to controller 12.

At least a portion of the intake air may be directed to a compressor 122 of turbocharger 120 via a first branch of the intake passage 140 as indicated at 142 and at least a portion of the intake air may be directed to a compressor 132 of turbocharger 130 via a second branch of the intake passage 140 as indicated at 144. Accordingly, engine system 100 includes a low-pressure AIS system (LP AIS) 191 upstream of compressors 122 and 132, and a high-pressure AIS system (HP AIS) 193 downstream of compressors 122 and 132.

A positive crankcase ventilation (PCV) conduit 198 (e.g., push-side pipe) may couple a crankcase (not shown) to the second branch 144 of the intake passage such that gases in the crankcase may be vented in a controlled manner from the crankcase. Further, evaporative emissions from a fuel vapor canister (not shown) may be vented into the intake passage through a fuel vapor purge conduit 195 coupling the fuel vapor canister to the second branch 144 of the intake passage.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown at FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes a charge air cooler (CAC) 154 and a throttle 158. The position of throttle 158 may be adjusted by the control system via a throttle actuator 157 communicatively coupled to controller 12. As shown, throttle 158 may be arranged in intake passage 149 downstream of CAC 154, and may be configured to adjust the flow of an intake gas stream entering engine 10.

As shown at FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 148 downstream of compressor 132, and a downstream end of CBV passage 150 may be coupled with intake passage 144 upstream of compressor 132. Similarly, an upstream end of a CBV passage 151 may be coupled with intake passage 146 downstream of compressor 122, and a downstream end of CBV passage 151 may be coupled with intake passage 142 upstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a compressor inlet pressure (CIP) sensor 196 is arranged in the intake passage 142 and a HP AIS pressure sensor 169 is arranged in intake passage 149. However, in other anticipated embodiments, sensors 196 and 169 may be arranged at other locations within the LP AIS and HP AIS, respectively. Among other functions, CIP sensor 196 may be used to determine a pressure downstream of an EGR valve 121.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via mechanical buckets in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. In still another alternative embodiment, the cams may not be adjustable.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via pneumatic actuator controlled by a solenoid valve. For example, the solenoid valve may receive a signal for facilitating the actuation of wastegate 128 via the pneumatic actuator based on the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve controlling a pneumatic actuator. For example, the solenoid valve may receive a signal for facilitating the actuation of wastegate 138 via the pneumatic actuator based on the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 180 downstream of turbine 134, while combustion products exhausted via exhaust passage 17 may be directed to the atmosphere via exhaust passage 170 downstream of turbine 124. Exhaust passages 170 and 180 may include one or more exhaust after-treatment devices, such as a catalyst, and one or more exhaust gas sensors. For example, as shown at FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically regenerated by operating at least one cylinder of the engine within a particular air/fuel ratio, for example.

Engine system 100 may further include one or more exhaust gas recirculation (EGR) systems for recirculating at least a portion of exhaust gas from the exhaust manifold to the intake manifold. These may include one or more high-pressure EGR systems for proving high pressure EGR (HP EGR) and one or more low-pressure EGR-loops for providing low pressure EGR (LP EGR). In one example, HP EGR may be provided in the absence of boost provided by turbochargers 120, 130, while LP EGR may be provided in the presence of turbocharger boost and/or when exhaust gas temperature is above a threshold. In still other examples, both HP EGR and LP EGR may be provided simultaneously.

In the depicted example, engine system 100 may include a low-pressure (LP) EGR system 108. LP EGR system 108 routes a desired portion of exhaust gas from exhaust passage 170 to intake passage 142. In the depicted embodiment, EGR is routed in an EGR passage 197 from downstream of turbine 124 to intake passage 142 at a mixing point located upstream of compressor 122. The amount of EGR provided to intake passage 142 may be varied by the controller 12 via EGR valve 121 coupled in the LP EGR system 108. In the example embodiment shown at FIG. 1, LP EGR system 108 includes an EGR cooler 113 positioned upstream of EGR valve 121. EGR cooler 113 may reject heat from the recirculated exhaust gas to engine coolant, for example. The LP EGR system may include a differential pressure over valve (DPOV) sensor 125. In one example, an EGR flow rate may be estimated based on the DPOV system which includes the DPOV sensor 125 that detects a pressure difference between an upstream region of the EGR valve 121 and a downstream region of EGR valve 121. EGR flow rate (e.g., LP EGR flow rate) determined by the DPOV system may be further based on an EGR temperature detected by an EGR temperature sensor 135 located downstream of EGR valve 121 and an area of EGR valve opening detected by an EGR valve lift sensor 131. In another example, EGR flow rate may be determined based on outputs from an EGR measurement system that includes an intake oxygen sensor 168, mass air flow sensor (not shown), manifold absolute pressure (MAP) sensor 182 and manifold temperature sensor 183. In some examples, both the EGR measurement systems (that is, the DPOV system including differential pressure sensor 125 and the EGR measurement system including intake oxygen sensor 168) may be used to determine, monitor and adjust EGR flow rate.

In an alternate embodiment, the engine system may include a second LP EGR system (not shown) that routes a desired portion of exhaust gas from exhaust passage 180 to intake passage 144. In another alternate embodiment, the engine system may include both the LP EGR systems (one routing exhaust gas from exhaust passage 180 to intake passage 144, and another routing exhaust gas from exhaust passage 170 to intake passage 142) described above.

In the depicted example, the engine system 100 may also include a HP EGR system 206. HP EGR system 206 routes a desired portion of exhaust gas from common exhaust passage 17, upstream of the turbine 124, to intake manifold 160, downstream of intake throttle 158. Alternatively, the HP EGR system 206 may be positioned between exhaust passage 17 and the intake passage 193, downstream of the compressor 122 and upstream of the CAC 154. The amount of HP EGR provided to intake manifold 160 may be varied by the controller 12 via EGR valve 210 coupled in the HP EGR passage 208. In the example embodiment shown at FIG. 1, HP EGR system 206 includes an EGR cooler 212 positioned upstream of EGR valve 210. EGR cooler 212 may reject heat from the recirculated exhaust gas to engine coolant, for example. The HP EGR system 206 includes a differential pressure over valve (DPOV) sensor 216. In one example, an EGR flow rate (e.g., HP EGR flow rate) may be estimated based on the DPOV system which includes the DPOV sensor 216 that detects a pressure difference between an upstream region of EGR valve 210 and a downstream region of EGR valve 210. EGR flow rate determined by the DPOV system may be further based on an EGR temperature detected by an EGR temperature sensor 220 located downstream of EGR valve 210 and an area of EGR valve opening detected by an EGR valve lift sensor 214. In alternate embodiments, the HP EGR passage 208 may not include a DPOV system.

Likewise, the engine may include a second high-pressure EGR loop (not shown) for recirculating at least some exhaust gas from the exhaust passage 19, upstream of the turbine 134, to the intake passage 148, downstream of the compressor 132, or to the intake manifold 160, downstream of intake throttle 158. EGR flow through HP-EGR loops 208 may be controlled via HP-EGR valve 210.

EGR valve 121 and EGR valve 210 may be configured to adjust an amount and/or rate of exhaust gas diverted through the corresponding EGR passages to achieve a desired EGR dilution percentage of the intake charge entering the engine, where an intake charge with a higher EGR dilution percentage includes a higher proportion of recirculated exhaust gas to air than an intake charge with a lower EGR dilution percentage. In addition to the position of the EGR valves, it will be appreciated that AIS throttle position of the AIS throttle 115, and other actuators may also affect the EGR dilution percentage of the intake charge. As an example, AIS throttle position may increase the pressure drop over the LP EGR system, allowing more flow of LP EGR into the intake system. As a result, this may increase the EGR dilution percentage, whereas less LP EGR flow into the intake system may decrease the EGR dilution percentage (e.g., percentage EGR). Accordingly, EGR dilution of the intake charge may be controlled via control of one or more of EGR valve position and AIS throttle position among other parameters. Thus, adjusting one or more of the EGR valves 121 and 210 and/or the AIS throttle 115 may adjust and EGR flow amount (or rate) and subsequently a percentage EGR in the mass air flow (e.g., air charge entering the intake manifold).

The engine 10 may further include one or more oxygen sensors positioned in the common intake passage 149. As such, the one or more oxygen sensors may be referred to as intake oxygen sensors. In the depicted embodiment, an intake oxygen sensor 168 is positioned upstream of throttle 158 and downstream of CAC 154. However, in other embodiments, intake oxygen sensor 168 may be arranged at another location along intake passage 149, such as upstream of the CAC 154. Intake oxygen sensor (IAO2) 168 may be any suitable sensor for providing an indication of the oxygen concentration of the intake charge air (e.g., air flowing through the common intake passage 149), such as a linear oxygen sensor, intake UEGO (universal or wide-range exhaust gas oxygen) sensor, two-state oxygen sensor, etc. In one example, the intake oxygen sensors 168 may be an intake oxygen sensor including a heated element as the measuring element. During operation, a pumping current of the intake oxygen sensor may be indicative of an amount of oxygen in the gas flow.

A pressure sensor 172 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 172 is a TIP sensor. In alternate examples, the reference intake pressure is a manifold pressure (MAP) as sensed by MAP sensor 182.

Engine system 100 may include various sensors 165, in addition to those mentioned above. As shown in FIG. 1, common intake passage 149 may include a throttle inlet temperature sensor 173 for estimating a throttle air temperature (TCT). Further, while not depicted herein, each of intake passages 142 and 144 may include a mass air flow sensor or alternatively the mass air flow sensor can be located in common duct 140.

Humidity sensor 189 may be included in only one of the parallel intake passages. As shown in FIG. 1, the humidity sensor 189 is positioned in the intake passage 142 (e.g., non PCV and non-purge bank of the intake passage), upstream of the CAC 154 and an outlet of the LP EGR passage 197 into the intake passage 142 (e.g., junction between the LP EGR passage 197 and the intake passage 142 where LP EGR enters the intake passage 142). Humidity sensor 189 may be configured to estimate a relative humidity of the intake air. In one embodiment, humidity sensor 189 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor.

Intake oxygen sensor 168 may be used for estimating an intake oxygen concentration and inferring an amount of EGR flow through the engine based on a change in the intake oxygen concentration upon opening of the EGR valve 121. Specifically, a change in the output of the sensor upon opening the EGR valve 121 is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

A zero point estimation of the intake oxygen sensor 168 may be performed during idle conditions where intake pressure fluctuations are minimal and when no PCV or purge air is ingested into the low pressure induction system. In addition, the idle adaptation may be performed periodically, such as at every first idle following an engine start, to compensate for the effect of sensor aging and part-to-part variability on the sensor output.

A zero point estimation of the intake oxygen sensor may alternatively be performed during engine non-fueling conditions, such as during a deceleration fuel shut off (DFSO). By performing the adaptation during DFSO conditions, in addition to reduced noise factors such as those achieved during idle adaptation, sensor reading variations due to EGR valve leakage can be reduced.

Now turning to FIG. 2, another example embodiment 200 of the engine of FIG. 1 is shown. As such, components previously introduced in FIG. 1 are numbered similarly and not re-introduced here for reasons of brevity.

Embodiment 200 shows a fuel tank 218 configured to deliver fuel to engine fuel injectors. A fuel pump (not shown) immersed in fuel tank 218 may be configured to pressurize fuel delivered to the injectors of engine 10, such as to injector 166. Fuel may be pumped into the fuel tank from an external source through a refueling door (not shown). Fuel tank 218 may hold a plurality of fuel blends, including fuel with a range of alcohol concentrations, such as various gasoline-ethanol blends, including E10, E85, gasoline, etc., and combinations thereof. A fuel level sensor 219 located in fuel tank 218 may provide an indication of the fuel level to controller 12. As depicted, fuel level sensor 219 may comprise a float connected to a variable resistor. Alternatively, other types of fuel level sensors may be used. One or more other sensors may be coupled to fuel tank 218 such as a fuel tank pressure transducer 220 for estimating a fuel tank pressure.

Vapors generated in fuel tank 218 may be routed to fuel vapor canister 22, via conduit 31, before being purged to engine intake 23. These may include, for example, diurnal and refueling fuel tank vapors. The canister may be filled with an appropriate adsorbent, such as activated charcoal, for temporarily trapping fuel vapors (including vaporized hydrocarbons) generated in the fuel tank. Then, during a later engine operation, when purge conditions are met, such as when the canister is saturated, the fuel vapors may be purged from the canister into the engine intake by opening canister purge valve (CPV) 112 and canister vent valve 114.

Canister 22 includes a vent 27 for routing gases out of the canister 22 to the atmosphere when storing, or trapping, fuel vapors from fuel tank 218. Vent 27 may also allow fresh air to be drawn into fuel vapor canister 22 when purging stored fuel vapors to engine intake 23 via purge lines 90 or 92 (depending on boost level) and purge valve 112. While this example shows vent 27 communicating with fresh, unheated air, various modifications may also be used. Vent 27 may include a canister vent valve 114 to adjust a flow of air and vapors between canister 22 and the atmosphere. The vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

Fuel vapors released from canister 22, for example during a purging operation, may be directed into engine intake manifold 160 via purge line 28. The flow of vapors along purge line 28 may be regulated by canister purge valve 112, coupled between the fuel vapor canister and the engine intake. The quantity and rate of vapors released by the canister purge valve 112 may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. The duty cycle may include a frequency (e.g., rate) of opening and closing the canister purge valve 112.

An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 182 coupled to intake manifold 160 and communicated with controller 12. Alternatively, MAP may be inferred from alternate engine operating conditions, such as mass air flow (MAF), as measured by a MAF sensor coupled to the intake manifold.

Purge hydrocarbons may be directed to intake manifold 160 via either a boost path 92 or a vacuum path 90 based on engine operating conditions. Specifically, during conditions when turbocharger 120 is operated to provide a boosted aircharge to the intake manifold, the elevated pressure in the intake manifold causes one-way valve 94 in the vacuum path 90 to close while opening one-way valve 96 in the boost path 92. As a result, purge air is directed into the air intake passage 140, downstream of air filter 156 and upstream of charge air cooler 154 via the boost path 92. Herein, the purge air is introduced upstream of intake oxygen sensor 168. In some embodiments, as depicted, a venturi 98 may be positioned in the boost path such that the purge air is directed to the intake upon passing through the venturi and passage 99. This allows the flow of purge air to be advantageously harnessed for vacuum generation.

During conditions when engine 10 is operated without boost, elevated vacuum in the intake manifold causes one-way valve 94 in the vacuum path to open while closing one-way valve 96 in the boost path. As a result, purge air is directed into the intake manifold 160, downstream of throttle 158 via the vacuum path 90. Herein, the purge air is introduced downstream of intake oxygen sensor 168.

PCV hydrocarbons may also be directed to intake manifold 160 via either a boost side PCV hose 252 or a vacuum side PCV hose 254 based on engine operating conditions. Specifically, blow-by gases from engine cylinders 14 flow past the piston rings and enter crankcase 255. During conditions when turbocharger 120 is operated to provide a boosted aircharge to the intake manifold, the elevated pressure in the intake manifold causes one-way valve 256 in vacuum side PCV hose 254 to close. As a result, during boosted engine operation, PCV gases flow in a first direction (arrow 264) and are received in the engine intake upstream of the intake oxygen sensor 168. Specifically, PCV air is directed into the air intake passage 140, downstream of air filter 156 and upstream of charge air cooler 154 via boost side PCV hose 252. The PCV flow may be directed to the intake passage upon passage through a boost side oil separator 260. The boost side oil separator may be integrated into the cam cover or may be an external component. Thus, during boosted conditions, the PCV gases are introduced upstream of intake oxygen sensor 168 and therefore do affect the output of oxygen sensor 168. The boosted conditions may include intake manifold pressure above ambient pressure.

In comparison, during conditions when engine 10 is operated without boost, elevated vacuum in the intake manifold causes one-way valve 256 in the vacuum side PCV hose 254 to open. As a result, during non-boosted engine operating, PCV gases flow in a second direction (arrow 262) different from the first direction and are received in the engine intake downstream of the intake oxygen sensor 168. In the depicted example, the second direction of PCV flow during non-boosted engine operation is opposite of the first direction of PCV flow during boosted engine operation (compare arrows 262 and 264). Specifically, during non-boosted operation, PCV air is directed into the intake manifold 160, directly, downstream of throttle 158 via the vacuum side PCV hose 254. The PCV flow may be directed to the intake manifold 160 upon passage through a vacuum side oil separator 258. Herein, the PCV air is introduced downstream of intake oxygen sensor 168, and therefore does not affect the output of oxygen sensor 168. Thus, due to the specific engine configuration, during boosted engine operation, PCV and purge air hydrocarbons are ingested into the engine intake manifold upstream of the intake oxygen sensor 168 and are ingested into the engine intake manifold downstream of the intake oxygen sensor during non-boosted conditions.

As previously discussed, the intake air oxygen sensor 168 can be used to measure the amount of EGR in the intake aircharge as a function of the amount of change in oxygen content due to the addition of EGR as a diluent. Thus, as more EGR is introduced, the sensor may output a reading or pumping current corresponding to a lower oxygen concentration. During the estimation, a nominal reference voltage (e.g., at 450 mV), or Nernst voltage, is applied to the sensor and an output (e.g., a pumping current output by the sensor upon application of the lower reference voltage) is noted. Based on the output of the sensor relative to a zero point of the sensor (that is, sensor output at no EGR conditions), a change in oxygen concentration is learned, and an intake dilution with EGR is inferred.

However, if the EGR estimation is performed during conditions when purging and/or crankcase ventilation is enabled (e.g., PCV flow is enabled), an output of the sensor is corrupted. Said another way, PCV and/or fuel vapor purge flow may cause an error in the output of the intake oxygen sensor. As such, purge air and/or positive crankcase ventilation hydrocarbons (e.g., PCV flow) may be ingested during boosted engine operating conditions along boost path 92 and boost side PCV hose 252 when the purge valve 112 is open and/or the PCV valve 256 is closed. The sensor output may be corrupted primarily due to the ingested hydrocarbons reacting with ambient oxygen at the sensing element of the intake sensor. This reduces the (local) oxygen concentration read by the sensor. Since the output of the sensor and the change in oxygen concentration is used to infer an EGR dilution of intake aircharge, the reduced oxygen concentration read by the intake oxygen sensor in the presence of purge air and/or PCV may be incorrectly interpreted as additional diluent. This impacts the EGR estimation and the subsequent EGR control. Specifically, EGR may be over-estimated.

FIG. 3 depicts this variation in the reading of the intake sensor. Specifically, map 300 depicts an oxygen concentration estimated by an intake manifold oxygen sensor along the y-axis and a PCV hydrocarbon (HC) content along the x-axis at a given EGR level. As the amount of PCV HCs ingested into the engine intake manifold increases, such as when PCV is enabled or flowing from the push-side pipe (e.g., conduit 198) during boosted conditions, the hydrocarbons react with oxygen at the sensing element of the intake oxygen sensor. The oxygen is consumed and water and carbon dioxide is released. As a result, the estimated oxygen concentration is reduced, even though an amount of EGR flow may remain constant. This reduction in oxygen concentration estimated by the oxygen sensor may be inferred as an increased dilution (or replacement of oxygen with EGR). Thus, the controller may infer that there is a larger amount of EGR flow available than actually is present. If not corrected for the hydrocarbon effect, a controller may decrease EGR flow in response to an incorrect indication of higher EGR dilution, degrading EGR control. For example, during purge and/or PCV flow conditions resulting in EGR over-estimation, the controller may decrease an opening of the EGR valve in response to a higher EGR estimate (based on a lower intake oxygen measurement from the intake oxygen sensor). However, actual EGR may be lower than the estimated level. Thus, EGR flow may be incorrectly reduced instead of maintained or increased. This may, in turn, result in increased engine emissions and degraded engine performance.

In one example, adjusting an intake oxygen measurement based on PCV flow may increase the accuracy of EGR flow estimates. Specifically, under certain engine operating conditions, an engine controller (such as controller 12 shown in FIG. 1) may determine a PCV flow contribution to the intake oxygen concentration measured at an intake oxygen sensor (such as the intake oxygen sensor 168 shown in FIGS. 1-2). If the PCV flow effect on intake oxygen under boost conditions is known, the controller may use this to correct the measured intake oxygen used to estimate EGR flow. As such, the EGR estimate may be corrected based on PCV flow.

For example, a blow-by map may be stored within a memory of the controller. The blow-by map may include an expected blow-by (e.g., expected amount of combustion chamber gases (predominantly inert) leaking through piston rings and/or compressor/turbine seals and flowing via PCV push-side pipe (e.g., conduit 198) to the intake and intake oxygen sensor) for current engine operating conditions. The blow-by map may be pre-determined during engine testing and may include an expected amount of blow-by for a current manifold pressure (MAP) and engine speed. In this way, the blow-by map may be in a form of a look-up table and may be used as a baseline for PCV push side flow (e.g., flow from PCV and to intake upstream of the oxygen sensor) with no hydrocarbons. Any measured hydrocarbons in excess of this amount may indicate excessive evaporation of crankcase fuel and hence high levels of noise to the IAO2 sensor reading.

One source of the hydrocarbons (HCs) in PCV flow may be from fuel accumulation in the engine oil in the crankcase of the engine. During engine cold start and warm-up conditions fuel may accumulate in the engine oil. Then, when the engine oil is warming up and/or after the engine oil has warmed up to a steady-state operating temperature, the accumulated fuel may be released as HCs into the air and PCV flow. The released HCs may affect fuel control and engine oil viscosity, thereby decreasing engine durability. As discussed above, when the engine is boosted, PCV flow may enter the engine intake upstream of the intake oxygen sensor. As a result, the HCs in the PCV may also affect the output of the intake oxygen sensor, thereby decreasing the accuracy of EGR flow estimation from the intake oxygen sensor output. In this way, the HCs in the intake airflow upstream of the intake oxygen sensor may result in measurement noise at the intake oxygen sensor.

By determining a fuel concentration in the engine oil, a hydrocarbon concentration in the intake airflow upstream of the intake oxygen sensor, and/or a fuel (e.g., hydrocarbon) evaporation rate from the engine oil, the effect of released HCs on engine fueling, the intake oxygen sensor, and consequently EGR flow estimates may be learned. This learned data may then be used to adjust engine operation including engine fueling, EGR flow rate, purge control, oil quality or viscosity monitor, etc. An instantaneous hydrocarbon concentration in the engine oil and fuel evaporation rate from the engine oil may be estimated based on one or more of engine oil temperature (EOT), an engine boosting condition, fuel composition (e.g., ethanol content of fuel used in the engine), compressor inlet pressure, crankcase pressure, and intake oxygen concentration measured from the intake oxygen sensor (e.g., such as the intake oxygen sensor 168 shown in FIGS. 1-2), or a model of any of or any combination of the above measurements. Specifically, the method of determining the instantaneous hydrocarbon concentration in engine oil and/or the fuel evaporation rate may include obtaining an intake oxygen sensor reading when EGR flow and purge flow are disabled and when the engine is boosted. As a result, the decrease in oxygen concentration measured at the intake oxygen sensor may be due to HCs from PCV flow alone and not due to additional diluents such as EGR flow and purge flow HCs. Further, when the engine is boosted, HCs from the crankcase are directed to the intake passage upstream of the intake oxygen sensor. The intake oxygen sensor may then be divided by an estimated vapor pressure to determine the instantaneous concentration of HCs in the engine oil. The vapor pressure may be based on the EOT and the fuel composition (e.g., the amount of heavy vs. light ends in the fuel). The fuel evaporation rate may then be determined based on a HC concentration gradient between the liquid and gaseous phases. The HC concentration in the liquid phase is the concentration of HCs in the engine oil and the HC concentration in the gaseous phased is approximated by the intake oxygen measurement of the intake oxygen sensor. The instantaneous HC concentration in engine oil and the fuel evaporation rate may be stored in a memory of the controller and then updated as subsequent intake oxygen sensor measurements are obtained.

In one example, the controller may use the determined fuel evaporation rate to adjust fuel injection to the engine. For example, as the estimated fuel evaporation rate increases, the controller may decrease fueling to the engine. In this way, the controller may adjust fuel injection based on the fuel evaporation rate estimates. Additionally, the controller may use the determined instantaneous HC concentration to adjust the intake oxygen sensor output (e.g., correct the intake oxygen sensor output for PCV HCs) and then estimate EGR flow based on the adjusted intake oxygen sensor output. The controller may then adjust an EGR valve based on the estimated EGR flow, thereby resulting in EGR control with increased accuracy. Methods for determining fuel evaporation rate, instantaneous hydrocarbon concentration in the engine oil, and adjusting engine operation based these values are discussed further below with reference to FIGS. 4A-5.

Additionally, when HCs exiting the crankcase through the PCV flow affect the intake oxygen sensor output, the controller may disable EGR (e.g., close an EGR valve) until the PCV impact on measured intake oxygen reduces below a threshold. In this way, EGR flow adjustments based on intake oxygen measurements reflecting a decrease in intake oxygen due to EGR and PCV HCs may be reduced. For example, if the engine system includes a LP EGR system, the controller may disable LP EGR flow when EGR flow estimates based on intake oxygen sensor output may have reduced accuracy due to PCV flow HCs. More specifically, the controller may disable LP EGR flow when the PCV HC impact on the intake oxygen sensor is greater than a threshold. The threshold may be based on a PCV HC amount that results in an EGR flow estimate different than actual EGR flow by an amount that may result in degraded EGR control. In one example, the PCV HC impact on the sensor may be determined based on a difference between the intake oxygen sensor output and estimated blow-by (determined from blow-by map) when both purge and EGR (LP EGR) are disabled (e.g., turned off). For example, the intake oxygen sensor output may be a change in intake oxygen (from a baseline or zero point value) due to HCs in the intake airflow. A difference between this intake oxygen sensor output and the expected blow-by indicate a larger amount of HCs than expected in the intake airflow. The increased amount of HCs may be from PCV and may result in degraded EGR estimates and EGR control. Thus, if the difference between the intake oxygen sensor output and the expected blow-by is greater than a threshold, the controller may disable EGR until the PCV HC impact decreases back below the threshold.

In another example, the PCV HC impact on the intake oxygen sensor may be determined based on a difference between a DPOV sensor reading and the intake oxygen sensor reading when purge is disabled and when LP EGR is not disabled (e.g., EGR is flowing). As described above, the DPOV sensor may be used to determine EGR flow. A first EGR flow estimate based on the DPOV sensor output may then be compared to a second EGR flow estimate based on the intake oxygen sensor output. If the difference between the DPOV sensor estimate and the intake oxygen sensor estimate for EGR is greater than a threshold, HCs from PCV may be affecting the oxygen reading and the controller may disable EGR until the PCV HC impact decreases back below the threshold. The controller may determine the PCV HC impact on the intake oxygen sensor when the engine is boosted, for example, only when the engine is boosted. Additionally, the controller may disable EGR based on the determined PCV HC impact only when the engine is boosted since the intake oxygen sensor reading is not affected by PCV HCs during non-boosted engine operation when the PCV HCs enter the intake passage downstream of the intake oxygen sensor.

In yet another example, the instantaneous HC concentration and/or the fuel evaporation rate determined by the method described above and presented at FIG. 5 may be used in determining the PCV HC impact on the intake oxygen sensor. If the PCV impact on the intake oxygen sensor cannot be determined or compensated for (e.g., cannot determine the instantaneous HC concentration in engine oil and/or the evaporation rate), the controller may set a diagnostic code (e.g., flag). This diagnostic code may then be used by the controller to trigger disabling the EGR flow. The PCV flow impact may not be able to be determined or compensated for during conditions when the fuel evaporation model is degraded. For example, the fuel evaporation rate may be used to predict subsequent intake oxygen measurements from the intake oxygen sensor. If a predicted intake oxygen sensor output based on the estimated fuel evaporation rate differs from an actual intake oxygen sensor output, the estimated evaporation rate may not be accurate. As a result, the controller may set a flag or diagnostic code indicating that the estimated HC concentration values used for intake oxygen sensor output compensation are degraded. As a result, the controller may set a flag and/or command that EGR be disabled for a duration until the accuracy of the fuel evaporation rate model increases back above a threshold.

In this way, when HCs are impacting intake oxygen sensor measurements, thereby resulting in inaccurate EGR flow estimates, the controller may disable EGR flow until the PCV HC impact decreases below a set threshold. As a result, EGR flow may only be enabled and adjusted when the PCV flow effect on the intake oxygen sensor may be compensated for, thereby resulting in EGR flow estimates of increased accuracy. Further, by estimating the evaporation rate and/or the instantaneous HC concentration in the intake air upstream from the intake oxygen sensor, the controller may improve the accuracy of fuel injection and EGR flow adjustments, thereby increasing engine efficiency.

The systems of FIGS. 1-2 described above provide for an engine system, comprising: an intake manifold, a crankcase coupled to the intake manifold via a PCV valve, a turbocharger with an intake compressor, an exhaust turbine, and a charge air cooler, an intake throttle coupled to the intake manifold downstream of the charge air cooler, and a canister configured to receive fuel vapors from a fuel tank, the canister coupled to the intake manifold via a purge valve. The system further comprises a low-pressure exhaust gas recirculation (EGR) passage coupled between an exhaust passage downstream of the exhaust turbine and an intake passage upstream of the intake compressor, the low-pressure EGR passage including a low-pressure EGR valve and low-pressure DPOV sensor for measuring low-pressure EGR flow. The system further comprises an intake oxygen sensor coupled to the intake manifold downstream of the charge air cooler and upstream of the intake throttle and a controller with computer readable instructions for disabling EGR flow responsive to a difference between an output of the intake oxygen sensor and an output of the DPOV sensor increasing above a first threshold when EGR is flowing and purge flow is disabled. The computer readable instructions further include instructions for maintaining EGR flow disabled responsive to a difference between the output of the intake oxygen sensor and expected blow-by increasing above a second threshold when EGR is not flowing and purge flow is disabled. The instructions also include instructions for maintaining the EGR flow disabled until the difference between the output of the intake oxygen sensor and expected blow-by decreases back below the second threshold.

As another embodiment, the computer readable instructions include instructions for: adjusting the low-pressure EGR valve based on an estimated fuel concentration in engine oil and an output of the intake oxygen sensor, the estimated fuel concentration in engine oil based on the output of the intake oxygen sensor when purge and EGR flow are disabled, engine oil temperature, and fuel composition. The computer readable instructions further include instructions for adjusting fuel injection to the injection based on an evaporation rate of fuel from the crankcase, the evaporation rate based on a concentration gradient between the estimated fuel concentration in engine oil and the output of the intake oxygen sensor. In another example, the computer readable instructions further include closing the low-pressure EGR valve in order to disable EGR flow responsive to a difference between a predicted output of the intake oxygen sensor and an actual output of the intake oxygen sensor being greater than a threshold amount, the predicted output of the intake oxygen sensor based on the evaporation rate. The threshold amount may be an amount indicative of increased hydrocarbons in the intake airflow upstream of the intake airflow. As a result, compensation for the PCV hydrocarbons may not be possible for EGR flow estimation.

Turning now to FIGS. 4A-4B, a method 400 is shown for disabling EGR flow when a hydrocarbon impact on an intake oxygen sensor is greater than a threshold. As described above, an increase in HC impact on the intake oxygen sensor (IAO2) may be due to PCV flow HCs during boosted engine operation. As shown in FIGS. 1-2, the IAO2 may be positioned in an intake passage, downstream of a compressor, an inlet of a LP EGR passage into the intake passage, and a push-side PCV passage (e.g., boost path 92 shown in FIG. 2). The LP EGR passage may include a DPOV sensor coupled to the LP EGR valve. Instructions for carrying out method 400 may be stored in a memory of an engine controller such as controller 12 shown in FIGS. 1-2. Further, method 400 may be executed by the controller.

Method 400 begins by estimating and/or measuring engine operating conditions at 402. Engine operating conditions may include an engine boost condition (e.g., boost level and boost on/off), EGR flow, MAP, engine speed, engine load, engine oil temperature (EOT), barometric pressure, humidity, crankcase pressure, etc. At 404, the method includes determining if the engine is boosted. If the engine is not boosted, the method continues to 406 to adjust EGR flow based on the IAO2 output and not estimate PCV (or HC) noise at the IAO2. The impact of PCV HCs on the IAO2 output may be referred to herein as PCV noise at the IAO2. As discussed above, when the engine is unboosted, PCV flow enters the engine intake downstream of the IAO2, thereby having no effect on the intake oxygen measured by the IAO2. However, if the engine is boosted, PCV HCs may enter the intake airflow upstream of the IAO2, thereby impacting the IAO2.

If the engine is boosted, the method continues on to 408 to determine if purge flow is off. For example, if a purge valve is closed and no purge is flowing to the intake passage, purge flow is disabled (e.g., off). As discussed above, in order to determine the impact of PCV HCs on the IAO2, purge must be disabled. Thus, if purge is not disabled, the method continues to 410 to determine if it is time to disable purge. The routine for determining the HC impact on the IAO2 may be run at a set frequency. For example, the IAO2 output relative to estimated blow-by or a DPOV sensor output (based on whether EGR is flowing or not, as described further below) may be checked at a set frequency in order to determine the PCV noise at the IAO2. If it is not time to disable purge for determining the PCV HC impact on the IAO2, the controller does not disable purge at 411. The method may return and wait until it is time to disable purge, as defined by the set checking frequency. In one example, the set checking frequency may be based on EOT. Specifically, if the engine is warming up (e.g., EOT is below a steady-state operating temperature), the checking frequency may be set to a first level based on the increasing EOT. For example, for each threshold increase in EOT (e.g., 5° C.) the controller may disable purge and determine the PCV HC impact on the IAO2. Once the EOT reaches steady-state such that the EOT is relatively constant, the controller may disable purge and determine the PCV noise less frequently. For example, purge may only be disabled once for determining PCV noise when the EOT is at steady-state. Then, following steady-state when the EOT begins to increase or decrease, the checking frequency may return to the first level based on the change in EOT.

Conversely at 410, if it is time to estimate PCV noise at the IAO2, the controller may disable purge at 412. Disabling purge may include closing a purge valve (e.g., CPV valve 112 shown in FIG. 2). At 414, the method includes determining if EGR is disabled (e.g., turned off). EGR may be disabled if the EGR valve is closed. As discussed above, the EGR may be LP EGR including a LP EGR passage with an inlet positioned upstream of the compressor and IAO2 in the intake passage. If EGR is disabled, the method continues on to 417 to obtain a measurement from the IAO2. The method may then continue on to 418 to determine the HC concentration in engine oil and/or a fuel evaporation rate from the engine oil based on the IAO2 output. The method for determining the HC concentration and fuel evaporation rate is shown at FIG. 5, described further below. In alternate embodiments, method 400 may not include determining the HC concentration in the oil and the fuel evaporation rate.

At 420, the method includes determining if a difference between the IAO2 output and an estimated blow-by is greater than a first threshold and/or if a flag has been set based on the fuel evaporation rate (as determined by the method presented at FIG. 5). For example, the IAO2 output may be a change in intake oxygen from a reference point due to diluents in the airflow. Since EGR and purge are both disabled, the decrease in intake oxygen measured by the IAO2 may be due to PCV HCs alone and not due to EGR and purge flow. As discussed above, the expected blow-by may be an expected amount of HCs in the intake airflow from PCV flow at the current engine operating conditions. Determining the expected blow-by may include looking up the expected blow-by in a look-up table or map stored in the memory of the controller. The expected blow-by may be a function of the current MAP and engine speed. Alternatively, the blow-by map may be determined by using the intake oxygen sensor measurement after an oil change when the fuel in the oil is negligible. The first threshold may be based on an amount of HCs indicating increased PCV HCs at the IAO2. The increased PCV HCs may be indicative of increased PCV noise resulting in EGR flow estimates of reduced accuracy. Additionally, the flag based on the fuel evaporation rate may be indicative of more PCV HCs than predicted by the fuel evaporation rate in the intake airflow. As a result, IAO2 compensation based on the estimated HC concentration in the engine oil (and the fuel evaporation rate) may not be accurate and may lead to EGR flow estimates of reduce accuracy. Thus, if the diagnostic flag indicating degraded fuel evaporation rate estimation is set and/or the difference between the IAO2 output and the expected blow-by is greater than the first threshold, the controller may disable EGR at 430 (shown in FIG. 4B). The controller may disable EGR until the PCV HC impact on the IAO2 decreases back below the threshold. Thus, the method at 430 may also include re-checking the PCV noise at a second frequency. The second frequency may be different than the set checking frequency described above at 410. For example, the second frequency may be a set amount of time or duration between determining the PCV noise at the IAO2. In some examples, the second frequency may be greater than the set checking frequency (and the first frequency as described further below with reference to 424) such that the PCV noise is checked more frequently when EGR has been disabled due to the PCV HC impact greater than the threshold. If the impact of PCV flow HCs on the IAO2 output is less than or equal to the threshold (e.g., the first threshold) during the re-checking at 432, the method continues to 434 to re-enable EGR. The method at 434 then returns to checking for PCV noise at a first frequency based on EOT.

Returning to 420, if neither a flag is set based on the fuel evaporation rate nor the difference between the IAO2 output and the expected blow-by is greater than the first threshold, the method continues on to 424 to not disable EGR. The method at 424 also includes re-x' checking PCV noise at the first frequency based on EOT, the first frequency lower than the second frequency such that the PCV noise is checked less often at the first frequency (e.g., a duration between subsequent PCV noise checks is longer at the first frequency when EGR is not disabled than at the second frequency when EGR is disabled).

Returning to 414, if EGR is not disabled (e.g., LP EGR is flowing and a LP EGR valve is at least partially open), the method continues on to 415 to determine if the engine includes a DPOV sensor. In some embodiments, the method at 415 may also include determining if the DPOV sensor is currently functioning properly. If a DPOV sensor is not present in the engine system (e.g., a DPOV sensor is not present for measuring LP EGR and/or HP EGR) or if the DPOV sensor is degraded, the method proceeds to 416 to disable EGR and continues on to 417 to obtain a measurement from the IAO2. The method then proceeds to 418 to determine the HC concentration in the oil and the evaporation rate from the IAO2 output and expected blow-by and not the DPOV sensor output. In this way, if no DPOV sensor is present, the method may turn off EGR in order to determine the impact of HCs on the IAO2 (e.g., determine the noise at the IAO2).

If, at 415, a DPOV sensor is included in the engine, the method may continue to 426 to obtain a measurement from the IAO2 and a measurement from the DPOV sensor in the LP EGR passage. As a result of the engine system including a DPOV sensor, EGR does not need to be turned off in order to determine the impact of HCs on the IAO2. Thus, determining PCV noise at the IAO2 may be performed less intrusively when a DPOV sensor is present and may be used to estimate EGR flow for comparison with the IAO2 output.

At 428, the method includes determining if an absolute value of a difference between the IAO2 output and the DPOV sensor output is greater than a second threshold. The second threshold may be indicative of an increased amount of HCs from PCV flow in the intake airflow which may result in a lower intake oxygen sensor measurement, thereby resulting in an EGR flow measurement of reduced accuracy. This may result in incorrect EGR flow adjustment, thereby degrading engine control. If the difference between the IAO2 output and the DPOV sensor output is not greater than the second threshold, the method continues on to 424 to not disable EGR and continue checking for PCV noise at the IAO2 at the first frequency based on EOT. However, if the difference between the IAO2 output and the DPOV sensor output is greater than the second threshold, the method continues on to 420 (shown in FIG. 4B) to disable EGR and re-check for PCV noise at the second frequency based on a set time duration. The method than continues on to 432 and 434 as described above. For example, after disabling EGR the method at 432 includes determining if the impact of PCV flow HCs on the IAO2 output is less than or equal to the threshold. The impact of PCV flow HCs may be determined from the difference between the IAO2 output and estimated blow-by and not the difference between the IAO2 output and the DPOV sensor output since EGR is disabled at 432.

In this way, a method for an engine comprises disabling EGR flow responsive to an impact of PCV flow hydrocarbons on an output of an intake oxygen sensor increasing above a threshold when purge flow is disabled, the impact of PCV flow hydrocarbons based a difference between the output of the intake oxygen sensor and an output of a DPOV sensor when EGR is flowing. In one example, the impact of PCV flow hydrocarbons is based on a difference between the output of the intake oxygen sensor and expected blow-by when EGR is not flowing. The expected blow-by is based on a pre-determined blow-by amount for a current manifold pressure and engine speed. For example, the expected blow-by may be stored within a look-up table in a memory of a controller of the engine. Inputs to the look-up table may include the current manifold pressure and engine speed. In alternate embodiments, the inputs to the look-up table may be alternative or additional engine operating conditions such as boost level and/or engine oil temperature.

The method further comprises when EGR flow is not disabled due to the impact of PCV flow hydrocarbons being below the threshold, disabling purge and determining the impact of PCV flow hydrocarbons while purge is disabled at a first frequency, the first frequency based on an engine oil temperature. Additionally, the method comprises after disabling EGR flow responsive to the impact of PCV flow hydrocarbons, disabling purge and determining a subsequent impact of PCV flow hydrocarbons while purge is disabled at a second frequency, the second frequency different than the first frequency. For example, the second frequency is a set time-based frequency and the first frequency is based on a set change in the engine oil temperature, the second frequency higher than the first frequency such that purge is disabled more often at the second frequency.

The method further comprises re-enabling EGR flow responsive to the impact of PCV flow hydrocarbons on the output of the intake oxygen sensor decreasing below the threshold. In another example, the disabling EGR flow responsive to the impact of PCV hydrocarbons on the output of the intake oxygen sensor increasing above a threshold includes disabling EGR responsive to a diagnostic flag indicating degradation of an estimated fuel concentration in engine oil, the diagnostic flag set in response to an expected output of the intake oxygen sensor differing from an actual output of the intake oxygen sensor by a threshold amount, the expected output of the intake oxygen sensor based on an estimated fuel evaporation rate from the engine oil. The estimated fuel evaporation rate is based on the output of the intake oxygen sensor, the estimated fuel concentration in engine oil, fuel composition, and engine oil temperature.

Disabling EGR flow includes disabling EGR during boosted engine operation. Additionally, disabling EGR flow includes closing an EGR valve positioned in a low-pressure EGR passage, the low-pressure EGR passage positioned between an exhaust passage downstream of a turbine and an intake passage upstream of a compressor. The intake oxygen sensor is positioned downstream of an inlet of the low-pressure EGR passage into the intake passage and the DPOV sensor is positioned in the low-pressure EGR passage.

In another example, the disabling EGR flow described above may be responsive to a degree of an impact of PCV flow hydrocarbons on the output of the intake oxygen sensor. The degree of impact of the PCV flow hydrocarbons may be based on the magnitude of the difference between the intake oxygen sensor output and the DPOV sensor output (if EGR is flowing) or the magnitude of difference between the intake oxygen sensor output and the expected blow-by (if EGR is not flowing). As the magnitude of one or more of these differences increases, the degree of impact of PCV flow hydrocarbons on the intake oxygen sensor may increase. The controller may then disable or not disable EGR based on the degree of the impact of PCV flow hydrocarbons. For example, if the degree of impact is greater than a threshold the controller may disable EGR. In another example, the controller may disable EGR for a longer duration and/or increase the impact of PCV flow checking frequency (e.g., second frequency described above) as the degree of the impact increases.

As described above, HCs from PCV flow may impact the output of the IAO2 and consequently influence the EGR flow estimate based on the IAO2 output. HCs released into the intake passage via the PCV flow may result from evaporation of fuel in engine oil in the engine crankcase. As the engine warms up, fuel may evaporate from the engine oil and be released as HCs into the PCV flow. These HCs may impact the IAO2 output during boosted engine operation. Fuel in the engine oil may also affect additional engine controls such as engine fueling. FIG. 5 shows a method 500 for estimating a fuel concentration in engine oil and a fuel evaporation rate from the engine oil. Instructions for executing method 500 may be stored in a controller (such as controller 12 shown in FIGS. 1-2). Further, the controller may execute the method 500 as described below.

At 502, the method includes determining an engine oil temperature (EOT). In one example, the EOT may be measured by a temperature sensor positioned in the engine oil in the crankcase or estimated through a model. At 504, the method includes determining a vapor pressure of the fuel based on the EOT and the type of fuel being used in the engine. For example, each type of fuel may have a constituent content with different amount of heavy and light ends. In one example, the method at 504 may utilize a vapor pressure model. The vapor pressure model may use the fuel constituent content (pre-determined based on fuel type and prior knowledge of fuel species that get accumulated in the oil) and the measured EOT to determine the current fuel vapor pressure of the dominant constituents. At 506, the method includes obtaining an IAO2 reading when both purge and EGR are disabled. The methods at 502 and 504 may be performed concurrently with the method at 506. For example, the controller may obtain the IAO2 reading for estimating the fuel concentration in engine oil only when purge and EGR flow are disabled. In another example, the controller may obtain the IAO2 reading for estimating the fuel concentration in engine oil (and subsequently adjusting engine operation based on the estimated fuel concentration in engine oil) in response to both purge and EGR being disabled. As described above, EGR flow being disabled may include when the EGR valve (e.g., LP EGR valve) is fully closed and no EGR is flowing into the intake passage upstream of the IAO2. Further, in another example, if EGR and/or purge are disabled for the fuel concentration and/or the PCV noise estimation (described at FIG. 4), EGR and/or purge may not be enabled even if requested by another engine system during the estimation period.

At 508 the method includes determining the instantaneous concentration of HCs in the engine oil by dividing the IAO2 output by the estimated vapor pressure. The IAO2 output may be proportional to the concentration of HCs in the gaseous phase while the determined concentration of HCs in the engine oil is the concentration of HCs in the liquid phase. At 510 the method includes determining the fuel evaporation rate from the engine oil based on a concentration gradient between the concentration of HCs in the liquid phase (e.g., oil) and the gaseous phase (e.g., air). In another embodiment, the fuel evaporation rate may be based on consecutive estimates of the fuel concentration in engine oil.

At 512 the method includes storing the instantaneous concentration of HCs in the oil (e.g., fuel concentration in engine oil) and the fuel evaporation rate in a memory of the controller. In one example, the fuel concentration in engine oil and the fuel evaporation may be stored as a function of EOT in a look-up table or chart. The engine controller may then reference the stored look-up table or chart during subsequent control routines wherein a fuel evaporation rate and/or fuel concentration in the engine oil is required. At 514 the method includes obtaining IAO2 measurements at a set interval or frequency and then updating the stored concentration of HCs in the oil and fuel evaporation rate based on the new IAO2 measurements, as described at steps 502-510. The set interval for estimating and updating the fuel concentration in the engine oil and fuel evaporation rate data may be based on the EOT and operational state of the engine. For example, if the engine is warming up and the EOT is not at steady-state the interval for estimating may be shorter than if the EOT is at steady-state (e.g., not changing substantially).

At 516 the method includes adjusting engine operation based on the fuel evaporation rate and the fuel concentration in the engine oil. In one example, adjusting engine operation may include adjusting fuel injection based on the fuel evaporation rate. For example, the controller may reduce a fuel injection amount or pressure as the fuel evaporation rate increases. In another example, the controller may adjust subsequent IAO2 outputs based on the HC concentration in the oil. For example, the IAO2 output may be corrected by the HC concentration in the oil such that the corrected IAO2 output reflects a decrease in intake oxygen due to EGR only and not due to PCV HCs. As a result, the controller may estimate EGR flow (e.g., LP EGR flow) based the adjusted IAO2 output. The controller may then adjust EGR flow (e.g., adjust a LP EGR valve) based on the estimated EGR flow. In alternate examples, the controller may also adjust HP EGR flow based on the adjusted IAO2 output in order to adjust a total amount of EGR provided to the engine. In some examples, the fuel evaporation rate may be used to estimate and/or predict subsequent IAO2 outputs. If an actual IAO2 differs by a threshold amount from a predicted IAO2 output, degradation of the fuel evaporation rate may be indicated. If the accuracy of the fuel evaporation rate estimation is degraded (e.g., reduced), EGR flow estimates based on the fuel concentration in the oil may be inaccurate. As a result, the controller may set a flag indicating that the change in intake oxygen measured at the IAO2 due to PCV HCs may not be compensated for with the method outlined at FIG. 5. As a result, the controller may disable EGR flow for a duration until the impact of HCs at the IAO2 is reduced, as described above with reference to FIGS. 4A-4B (at step 420). In yet another example, if the fuel evaporation rate exceeds a threshold rate, the controller may set a flag as an indicator to the EGR arbitration strategy shown at step 420 in FIG. 4A. Thus, the method shown at FIGS. 4A-4B may include disabling EGR flow for a duration based on the estimated evaporation rate increasing above the threshold rate. In alternate examples, the fuel evaporation rate may be used to adjust additional engine controls such as fuel injection routines or adjusting estimates of engine oil viscosity for additional control routines such as oil minder.

As one embodiment, a method for an engine comprises adjusting engine operation based on a fuel concentration in engine oil, the fuel concentration based on an output of an intake oxygen sensor when purge and EGR flow are disabled, engine oil temperature, and fuel composition. The method further comprises estimating a fuel evaporation rate from the engine oil based on a concentration gradient between the fuel concentration in engine oil and the output of the intake oxygen sensor, the output of the intake oxygen sensor indicative of a fuel concentration in intake air. In one example, adjusting engine operation includes adjusting fuel injection to the engine based on estimated fuel evaporation rate, an amount of fuel injected decreasing with increasing estimated fuel evaporation rate. In another example, adjusting engine operation includes disabling EGR flow for a duration when an actual output of the intake oxygen sensor differs from an expected output of the intake oxygen sensor by a threshold amount, the expected output based on the estimated fuel evaporation rate. In yet another example, adjusting engine operation includes adjusting a position of an EGR valve based on the output of the intake oxygen sensor relative to the fuel concentration in engine oil. The EGR valve may be a low-pressure EGR valve in a low-pressure EGR system. In another example, the EGR valve may be a high-pressure EGR valve in a high-pressure EGR system.

The fuel concentration may be further based on crankcase pressure and boost conditions. For example, the fuel concentration may only be determined when the engine is boosted. The intake oxygen sensor is positioned in an intake passage downstream of an inlet of a low-pressure EGR passage into the intake passage, the low-pressure EGR passage positioned between an exhaust passage downstream of a turbine and an intake passage upstream of a compressor.

As another embodiment, a method for an engine comprises during boosted engine operation, flowing PCV gases to an engine intake upstream of an intake oxygen sensor; estimating a vapor pressure based on an engine oil temperature and a composition of fuel; estimating a fuel concentration in engine oil based on the estimated vapor pressure and an output of the intake oxygen sensor when purge flow and EGR are disabled; and adjusting an EGR valve based on the estimated fuel concentration in engine oil and the output of the intake oxygen sensor. The method further comprises estimating a fuel evaporation rate from the engine oil based on a concentration gradient between the output of the intake oxygen sensor and the estimated fuel concentration in engine oil. Additionally, the method comprises adjusting engine fueling based on the estimated fuel evaporation rate.

Further still, the method comprises setting a diagnostic flag to disable EGR and indicating degradation of the estimated fuel concentration in engine oil due to an expected output of the intake oxygen sensor differing from an actual output of the intake oxygen sensor by a threshold amount, the expected output of the intake oxygen sensor based on the estimated fuel evaporation rate. After setting the diagnostic flag to disable EGR, the method may include removing the diagnostic flag to re-enable EGR when the expected output of the intake oxygen sensor based on the estimated fuel evaporation rate is within the threshold amount of the actual output of the intake oxygen sensor. In one example, the method includes disabling purge at a first frequency in order to determine if degradation of the estimated fuel concentration in engine oil is indicated, the first frequency based on engine oil temperature when EGR is not disabled due to an impact of hydrocarbons on the output of the intake oxygen sensor. In another example, the method includes disabling purge at a second frequency, higher than the first frequency, in order to determine if degradation of the estimated fuel concentration in engine oil is indicated, the second frequency based on a set time duration when EGR has been disabled due to the impact of hydrocarbons on the output of the intake oxygen sensor.

Additionally, the method comprises storing the estimated fuel evaporation rate and the estimated fuel concentration in engine oil as a function of engine oil temperature in a memory of a controller of the engine. A controller of the engine may obtain an output of the intake oxygen sensor at a set interval when purge and EGR are disabled and then update the stored fuel evaporation rate and fuel concentration in engine oil, the set interval based on engine oil temperature. During non-boosted engine operation, the method includes flowing PCV gases to the engine intake downstream of the intake oxygen sensor and adjusting the EGR valve based on the output of the intake oxygen sensor on not based on the estimated fuel concentration in engine oil.

Turning now to FIG. 6, a graphical example of adjustments to EGR flow based on estimates of the impact of PCV HCs on an IAO2 output is shown. Specifically, graph 600 shows changes in engine oil temperature (EOT) at plot 602, changes in a purge off command (e.g., command to disable purge) at plot 604, changes in EGR flow (e.g., LP EGR) at plot 606, changes in boost at plot 608, changes in a difference between an IAO2 output and DPOV sensor output at plot 610, changes in a difference between an IAO2 output and expected blow-by at plot 612, and changes to a set diagnostic flag based on the fuel evaporation rate at plot 614. As discussed above, the flag based on the fuel evaporation rate may indicate the impact of PCV HCs on the IAO2 output is over a threshold.

Prior to time t1, the engine is boosted (plot 608) and the EOT may be increasing from a lower threshold temperature (plot 602), thereby indicating the engine oil is warming up. As a result, the controller may disable purge flow (or command purge flow off) at a first frequency, $\Delta F1$ (plot 604). Disabling purge flow may include closing a canister purge valve to stop the flow of purge gases to the engine intake. If the purge valve is already closed, the controller may maintain the valve in the closed position during the command to disable purge. The first frequency $\Delta F1$ may be based on the EOT such that purge is commanded off to determine the PCV noise on the IAO2 for every set increase in EOT. For example, the set increase may be 5° C. such that purge is disabled to perform the PCV noise check (e.g., impact of PCV HCs on the IAO2 output) every increase in EOT by 5° C. In alternate examples, the set increase in EOT may be more or less than 5° C. Also prior to time t1, EGR may be enabled (e.g., LP-EGR valve at least partially open and LP-EGR is flowing). After disabling purge, the controller may re-enable purge. However, if purge is commanded closed based on additional engine operating conditions, the purge valve may remain closed even if purge flow is not disabled for the PCV noise estimating routine.

At time t1, the difference between the output of the IAO2 sensor and the output of the DPOV sensor may be greater than a first threshold, T1 (plot 610). Since EGR is flowing, both the IAO2 output and the DPOV sensor output may provide estimates of EGR flow. If these estimates differ by an amount greater than the first threshold T1, blow-by hydrocarbons from PCV flow may be affecting the IAO2 sensor output. In response to the difference between the output of the IAO2 and the output of the DPOV sensor being greater than the first threshold T1, the controller may disable EGR (plot 606). For example, the controller may close a LP EGR valve positioned in a LP EGR passage in order to stop LP EGR flow from flowing into the intake passage upstream of the IAO2 sensor.

After disabling EGR flow at time t1, the controller may re-check the PCV noise at the IAO2 by disabling purge and re-checking the difference between the IAO2 output and predicted blow-by at a second frequency $\Delta F2$. The second frequency $\Delta F2$ may be based on set time intervals rather than based on EOT. In some examples, as shown in FIG. 6, the second frequency $\Delta F2$ may be higher than the first frequency $\Delta F1$ such that the PCV noise impact on the IAO2 is checked more frequently after purge has been disabled due to PCV noise being above a threshold. In alternate embodiments, the first frequency and the second frequency may be substantially the same.

Between time t1 and time t2, a flag may be set based on the estimated fuel evaporation rate (plot 614). As discussed above, if the impact of PC HCs on the IAO2 output may not be compensated for using an estimated fuel concentration in the engine oil, the controller may disabled purge. For example, if the IAO2 is different than predicted by the fuel evaporation rate by a threshold amount, the controller may set the flag resulting in disabling EGR. Since EGR is already disabled between time t1 and time t2, the EGR remains off responsive to the flag.

At time t2, the difference between the IAO2 output and the expected blow-by decreases back below a second threshold T2 (plot 612), thereby indicating the impact of PCV noise on the IAO2 has decreased back below a set threshold. As a result, the controller may re-enable EGR responsive to the difference between the IAO2 output and the expected blow-by being below the second threshold T2. Re-enabling EGR flow may include opening the LP EGR valve and adjusting LP EGR flow to a requested level. Additionally, the second threshold T2 may be different than the first threshold T1.

At time t3 the EOT reaches steady-state such that the EOT is substantially steady and no longer increasing (plot 602). As a result, since EGR is enabled, the controller may only disable purge and check the impact of PCV hydrocarbons on the IAO2 once while the EOT remains at steady-state conditions. In alternate embodiments, the controller may check PCV noise and disable purge more than once, but at a frequency lower than the first frequency $\Delta F1$ and the second frequency $\Delta F2$.

At time t4 the EOT begins increasing again above the steady-state level (plot 602). As a result, the controller begins disabling purge and checking PCV noise at the IAO2 at the first frequency $\Delta F1$. At time t5, the controller determines that the difference between the IAO2 output and the expected blow-by (BB) is greater than the second threshold T2. In response to the difference between the IAO2 output and the expected BB being greater than the second threshold T2, the controller commands EGR flow off (e.g., closes the LP EGR valve). However, since EGR flow is already disabled (plot 606), the controller maintains the disabled EGR flow at time t5. After time t5, the controller begins disabling purge and checking the PCV noise at the IAO2 at the second frequency ΔF2.

As shown at time t1 in FIG. 6, during a first condition when EGR is flowing and purge is disabled, an engine controller may disable EGR when a difference between an output of an intake oxygen sensor and an output of a DPOV sensor is greater than a first threshold T1. As shown at time t5, during a second condition when EGR is not flowing and purge is disabled, the engine controller may disable EGR flow when a difference between the output of the intake oxygen sensor and an expected blow-by flow is greater than a second threshold T2. Disabling EGR flow during the second condition may include maintaining EGR flow off (e.g., maintain the EGR valve closed) until the difference between the intake oxygen sensor output and the expected blow-by decrease back below the second threshold T2. The controller may then turn on EGR if EGR is requested based on additional engine operating conditions.

As shown at time t2, the controller may re-enable EGR flow after the disabling EGR when the difference between the output of the intake oxygen sensor and the expected blow-by flow is not greater than the second threshold T2 when purge is disabled. As discussed above the expected blow-by may be stored in a memory of a controller in a look-up table as a function of current engine speed and manifold pressure.

As shown prior to time t1 and between time t4 and time t5, when engine oil temperature is not at steady-state, the controller may disable purge and determine the difference between the output of the intake oxygen sensor and the output of the DPOV sensor or the difference between the output of the intake oxygen sensor and the expected blow-by flow at a first frequency. Then, as shown between time t3 and time t4 when the engine oil temperature is at steady-state, the controller may disable purge and determine the difference between the output of the intake oxygen sensor and the output of the DPOV sensor or the difference between the output of the intake oxygen sensor and the expected blow-by flow only once.

As shown between time t1 and time t2 and after time t5, after disabling EGR, the controller may disable purge and determine the difference between the output of the intake oxygen sensor and expected blow-by flow at a second frequency, the second frequency higher than the first frequency. As discussed above, the DPOV sensor is positioned in a low-pressure EGR passage and the intake oxygen sensor is positioned in an intake passage downstream from a PCV passage inlet during boosted conditions and downstream from an inlet of the low-pressure EGR passage.

In this way, when hydrocarbons from PCV flow are impacting the output of an intake oxygen sensor, an engine controller may temporarily disable EGR flow. Then, when the impact of PCV flow hydrocarbons reduces below a threshold, the controller may re-enable EGR flow. The controller may then estimate EGR flow based on the output of the intake oxygen sensor. In one example, the output of the intake oxygen sensor may be adjusted based on an estimated fuel concentration in engine oil. As such, a technical effect is achieved by either adjusting an intake oxygen sensor output to compensate for PCV hydrocarbons or temporarily disabling EGR flow when the effect of PCV hydrocarbons on the intake oxygen sensor is above a threshold. In this way, EGR flow adjustments may only be made when the EGR flow is estimated based on an intake oxygen sensor output reflective of a decrease in intake oxygen due to EGR only and not due to PCV flow. As a result, EGR system control may increase and engine emissions may be maintained at desired levels.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during engine oil warm-up,
   operating with EGR while purging fuel vapors to an engine intake with purge flow disabled at a first frequency; and
   in response to a difference between EGR estimated by an oxygen sensor and EGR estimated by a pressure sensor being higher than a threshold, disabling the purge flow at a second, higher frequency.

2. The method of claim 1, wherein the EGR estimated by the oxygen sensor includes EGR flow rate estimated via an intake oxygen sensor positioned upstream of an intake throttle and downstream of a charge air cooler, and wherein the EGR estimated by the pressure sensor includes EGR flow rate estimated via a differential pressure over valve sensor coupled across an EGR valve.

3. The method of claim 2, further comprising, in response to the difference being higher than the threshold, disabling EGR.

4. The method of claim 3, further comprising, while operating with EGR, checking PCV noise on the intake oxygen sensor when the purge flow is disabled based on an output of the intake oxygen sensor relative to an output of the differential pressure over valve sensor.

5. The method of claim 4, further comprising, after disabling EGR, checking PCV noise on the intake oxygen sensor when the purge flow is disabled based on the output of the intake oxygen sensor relative to predicted blow-by.

6. The method of claim 1, wherein the first frequency of disabling purge flow is based on engine oil temperature, and wherein the second frequency of disabling purge flow is not based on engine oil temperature.

7. The method of claim 6, wherein disabling purge flow at the first frequency based on engine oil temperature includes closing a canister purge valve for every threshold increase in engine oil temperature.

8. The method of claim 6, wherein the second frequency of disabling purge flow is based on a set time duration.

9. A method for an engine, comprising:
flowing EGR from an engine exhaust to an engine intake via an EGR valve;
commanding canister purge flow off at a first frequency;
determining PCV noise on an intake oxygen sensor while the canister purge flow is off; and
in response to increased PCV noise, disabling EGR and commanding canister purge flow off at a second, higher frequency.

10. The method of claim 9, wherein determining PCV noise on the intake oxygen sensor includes comparing EGR flow estimated by the intake oxygen sensor with EGR flow estimated by a differential pressure over valve sensor coupled to the EGR valve.

11. The method of claim 10, further comprising indicating increased PCV noise in response to a difference between the EGR flow estimated by the intake oxygen sensor and the EGR flow estimated by the differential pressure over valve sensor being higher than a threshold.

12. The method of claim 10, further comprising, determining PCV noise while EGR is disabled by comparing the EGR flow estimated by the intake oxygen sensor with an expected blow-by amount, the expected blow-by amount based on manifold pressure and engine speed.

13. The method of claim 9, wherein the EGR is one of high pressure and low pressure EGR.

\* \* \* \* \*